United States Patent [19]

Takamatsu et al.

[11] Patent Number: 4,632,870
[45] Date of Patent: Dec. 30, 1986

[54] MAGNETIC RECORDING MEDIUM

[75] Inventors: Shigeru Takamatsu, Komoro; Yuji Ishihara, Saku; Masahiro Takizawa, Komoro, all of Japan

[73] Assignee: TDK Corporation, Tokyo, Japan

[21] Appl. No.: 702,193

[22] Filed: Feb. 15, 1985

[30] Foreign Application Priority Data

Feb. 20, 1984 [JP] Japan .................................. 59-28722

[51] Int. Cl.[4] .............................................. G11B 5/70
[52] U.S. Cl. .................................. 428/329; 252/62.54; 427/128; 360/134; 360/135; 360/136; 428/323; 428/694; 428/900
[58] Field of Search .............. 428/694, 695, 329, 900, 428/323; 427/128, 131; 252/62.54; 360/134—136

[56] References Cited

U.S. PATENT DOCUMENTS

| | | | |
|---|---|---|---|
| 3,929,658 | 12/1975 | Beske | 427/128 |
| 4,117,190 | 9/1978 | Ahashi | 428/329 |
| 4,275,115 | 6/1981 | Naruse | 428/900 |
| 4,399,189 | 8/1983 | Nakashima | 428/900 |

*Primary Examiner*—Ellis P. Robinson
*Attorney, Agent, or Firm*—Neuman, Williams, Anderson & Olson

[57] ABSTRACT

A magnetic recording medium comprising a plastic base of polyester film or the like having a magnetic coat formed on one side, the magnetic coat consisting of a dispersion of a ferromagnetic powder in a resin binder, characterized in that the magnetic coat contains a non-magnetic composite oxide powder of a spinel structure in an amount of 0.5 to 15% by weight on the basis of the ferromagnetic powder weight. The composite oxide in powder form ranges in particle diameter from 0.1 to 0.7 $\mu m$ and has a Mohs hardness of not less than 5.

2 Claims, 2 Drawing Figures

MAGNETIC RECORDING MEDIUM

BACKGROUND OF THE INVENTION

This invention relates to a magnetic recording medium comprising a plastic base of polyester film or the like uniformly coated on one side with a dispersion of a ferromagnetic powder in a resin binder.

It is common knowledge with the manufacture of magnetic recording media, such as audio and video tapes and floppy discs, to reinforce the magnetic recording coat by the addition of a finely divided, nonmagnetic inorganic material so as to protect the coat against damage due to contact with the magnetic head of a recorder. However, unless the kind, particle size, and quantity of the nonmagnetic inorganic powder are properly chosen, the addition can impair or increase the abrasive wear of the head. Recently, especially with video cassette tapes, there has been increasing demand for greater wear resistance (better still characteristic) to cope with the spread of video tape recorders (VTRs) featuring such auxiliary functions as still and slow motion modes. On the other hand, the introduction of more and more high-performance video tapes has entailed a tendency to use finer ferromagnetic particles, a trend unfavorable for the still characteristic. As countermeasures, attempts have been made to harden the material of nonmagnetic inorganic particles or to increase the proportion of the powder to be added. Both attempts have, however, brought rather serious drawbacks such as increased wear of the head and shortened head life. We have studied on nonmagnetic inorganic materials which would lessen the impairment of the magnetic recording medium and reduce the wear of the head.

SUMMARY OF THE INVENTION

The present invention has for its object the provision of a magnetic recording medium which is less impaired by running past the magnetic head of the recorder and causes less wear of the head than conventional media.

The magnetic recording medium according to the invention comprises a plastic base of polyester film or the like having a magnetic coat formed on one side, the magnetic coat consisting of a dispersion of a ferromagnetic powder in a resin binder, characterized in that the magnetic coat contains a nonmagnetic composite oxide powder of a spinel structure in an amount of 0.5 to 15% by weight on the basis of the ferromagnetic powder weight. The composite oxide in powder form ranges in particle diameter from 0.1 to 0.7 $\mu$m.

The invention employs, in place of the usually used single-element oxides, a composite oxide of a spinel structure which makes the magnetic coat of the magnetic recording medium adequately wear-resistant and reduces the wear of the recorder head. While these two properties have long been believed incompatible, our invention has successfully imparted both, without any compromise of either, to the magnetic recording medium by the adoption of a composite oxide having a spinel structure.

DETAILED DESCRIPTION OF THE INVENTION

Figure 1:
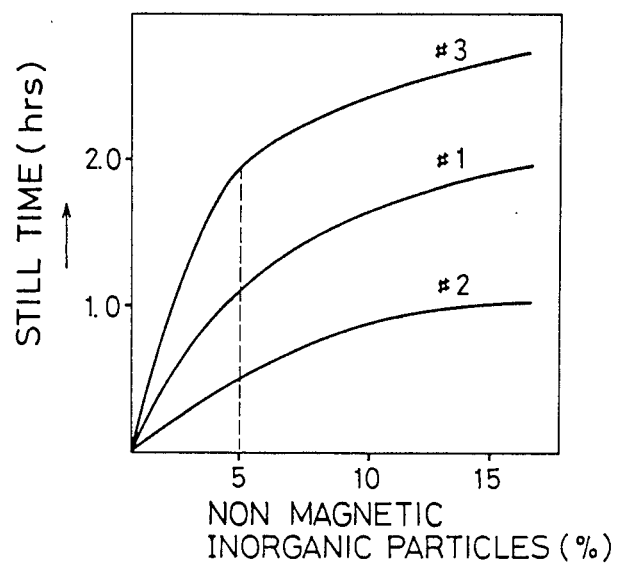
FIG. 1 is a graph showing the relation between the nonmagnetic inorganic powder contents on the basis of the ferromagnetic powder amount in magnetic coats and the still characteristics of the resulting media.

Generally speaking, the still characteristic of the video recording medium and the abrasive wear of the recorder head are inconsistent with each other and the both depend on the hardness and particle size of the nonmagnetic inorganic powder used as a reinforcing agent. With a powder having a hardness of less than 5 on Mohs scale, no appreciable reinforcing effect can be anticipated. Conversely, a powder having a Mohs hardness in excess of 9 accelerates the wear of the head. If the particle size is finer than 0.1 $\mu$m the reinforcing effect to be achieved is negligible, but if the size exceeds 0.7 $\mu$m the powder unfavorably influences the electromagnetic transfer characteristics of the resulting medium. For these reasons a finely divided, nonmagnetic inorganic material having a Mohs hardness of 5 or more and a particle size in the range of 0.1 to 0.7 $\mu$m is suitable for use as a reinforcing agent for the magnetic recording medium of the invention. After examining various powdery inorganic materials, we have now found that composite oxides having spinel structures are suitable as reinforcing agents for magnetic recording media. Experiments have shown that those oxides used as reinforcing agents give magnetic recording media with good still characteristics and video S/N ratios with low rates of wear of the head. The invention is illustrated by the following example and comparative examples.

EXAMPLE AND COMPARATIVE EXAMPLES

A magnetic coating material of the composition consisting of

| | |
|---|---|
| Co-$\eta$—$Fe_2O_3$ needles, powdered | 100 wt % |
| nitrocellulose | 8 |
| vinyl chloride-vinyl acetate copolymer | 4 |
| urethane | 10 |
| carbon | 5 |
| MEK | 250 |
| isocyanate compound | 4 |
| composite oxide of spinel structure | 5, 10, or 15 | was prepared.

The inorganic powder added was varied as shown in Table I, and specimens of Example 1 and Comparative Examples 1 and 2 were obtained.

TABLE I

| | Specimen | Nonmagnetic inorganic powder | Average particle size, $\mu$m |
|---|---|---|---|
| Example 1 | #1 | $ZnAl_2O_4$ | 0.3–0.5 |
| Comp. Ex. 1 | #2 | $\eta$-$Al_2O_3$ | below 0.1 |
| Comp. Ex. 2 | #3 | $\alpha$-$Al_2O_3$ | 0.3–0.5 |

Each mixture, consisting of the coating material of the above formulation minus the composite oxide, and one of the nonmagnetic inorganic material powders shown in Table I, was thoroughly dispersed and mixed by a ball mill. The mixture was then applied on a 15 $\mu$m-thick base of polyester film to obtain a specimen. Although the amount of the nonmagnetic inorganic powder used was 5, 10, or 15% by weight according to the above formulation, it can vary from 0.5 to 15% by weight. If the powder proportion is less than 0.5% by weight, its reinforcing effect upon the magnetic coat is negligible. Conversely if it exceeds 15% by weight the powder accelerates the wear of the head and deteriorates the electromagnetic transfer characteristics of the recording medium. The ferromagnetic powder to be used is not what characterizes the present invention. Any of the usually used ferromagnetic powders for magnetic recording media, such as an alloy, oxide, or Co-containing oxide powder, may be employed. The resin binder that constitutes the magnetic coat does not characterize the invention, either; it may be any of thermoplastic, thermosetting, electron-ray-cured, and other binders in use for magnetic recording media. Especially suitable is a binder comprising resinous ingredients of nitrocellulose, urethane, vinyl chloride-vinyl acetate copolymer, and isocyanate or of urethane, vinyl chloride-vinyl acetate copolymer, and isocyanate. In order to reduce the abrasion of the magnetic coat and improve the running quality of the medium, a fatty acid having 12 to 20 carbon atoms or an ester of the fatty acid and a monohydric alcohol having 3 to 12 carbon atoms or both may be utilized as a lubricant.

Figure 2:
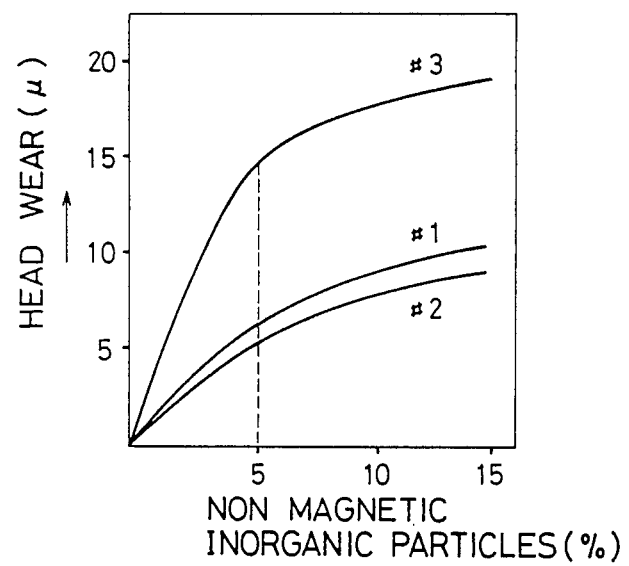
FIG. 2 is a graph showing the relation between the nonmagnetic inorganic powder contents and the degrees of wear of the recorder head.

The relations of the nonmagnetic inorganic powder contents of the specimens to the still characteristics and to the wear of the head are graphically represented in FIGS. 1 and 2, respectively.

For the tests a video deck of the VHS system was used. The still time in the pause mode with a back tension of 50 g and the wear of the head after 100 passes of the tape past the head on the VHS system video deck were determined.

As is obvious from FIGS. 1 and 2, Comparative Example 1 (Specimen #2) causes a low degree of wear of the head but confers a poor still characteristic on the medium. The reverse is true of Comparative Example 2 (Specimen #3). Specimen #1 of Example 1 gives a still characteristic slightly inferior to that of Specimen #3 of Comparative Example 2 but on a practically passable level and causes remarkably less wear of the head to offset the drawback common to the specimens of Comparative Examples.

What is claimed is:

1. A magnetic recording medium comprising a plastic base and a magnetic coat formed thereon which comprises a ferromagnetic powder dispersed in a resin binder, said magnetic coat also containing finely divided nonmagnetic particles of the composite oxide of zinc and aluminum having a spinel structure and the general formula $ZnAl_2O_4$ and having an average particle diameter of 0.1 to 0.7 $\mu$m as measured by electron microphotography.

2. A magnetic recording medium according to claim 1 wherein said composite oxide of zinc and aluminum has a hardness in the range of from about 5 to 9 on the Mohs scale.

* * * * *